United States Patent
Schwartz

4,070,093
Jan. 24, 1978

[54] MINIMIZING TRANSMISSION PATH DISABLING DUE TO DEFECTIVE TRANSMISSION MEMBERS OF A COMMUNICATIONS CABLE

[75] Inventor: Morton I. Schwartz, Atlanta, Ga.

[73] Assignee: Bell Telephone Laboratories, Incorporated, Murray Hill, N.J.

[21] Appl. No.: 718,082

[22] Filed: Aug. 26, 1976

[51] Int. Cl.² .............................................. H01B 11/02
[52] U.S. Cl. ........................... 350/96 B; 350/96 WG; 350/96 R; 174/34
[58] Field of Search ............. 350/96 R, 96 B, 96 WG, 350/96 G; 174/34

[56] References Cited

U.S. PATENT DOCUMENTS

| 3,702,275 | 11/1972 | Hooker | 350/96 B X |
| 3,728,521 | 4/1973 | Borough et al. | 350/96 B X |
| 3,763,586 | 10/1973 | Western | 350/96 B X |
| 3,786,840 | 1/1974 | Courtney-Pratt et al. | 350/96 B X |
| 3,978,275 | 8/1976 | Ishihara et al. | 174/34 |

*Primary Examiner*—John K. Corbin
*Assistant Examiner*—R. Hille
*Attorney, Agent, or Firm*—Charles E. Graves

[57] ABSTRACT

The transmission members of a communications cable are effectively rearranged in their relative locations within a cable core of predetermined end array configuration, by assigning all defective members to a designated small area of the end configuration. As a result, when gang type connectors are applied at the cable core ends preparatory to straight-through splicing, the defective members are all relegated to a designated, fixed end region of the connector. When several such cables are spliced together, the defective members occasion a minimum of transmission path disabling, because they are largely connected to each other instead of being distributed throughout the entire cable cross section where their potential disabling impact would be proliferated. The approach is particularly advantageous for mitigating transmission path disabling in optical fiber cables in which the core consists of several stacked multi-fiber ribbons.

16 Claims, 6 Drawing Figures

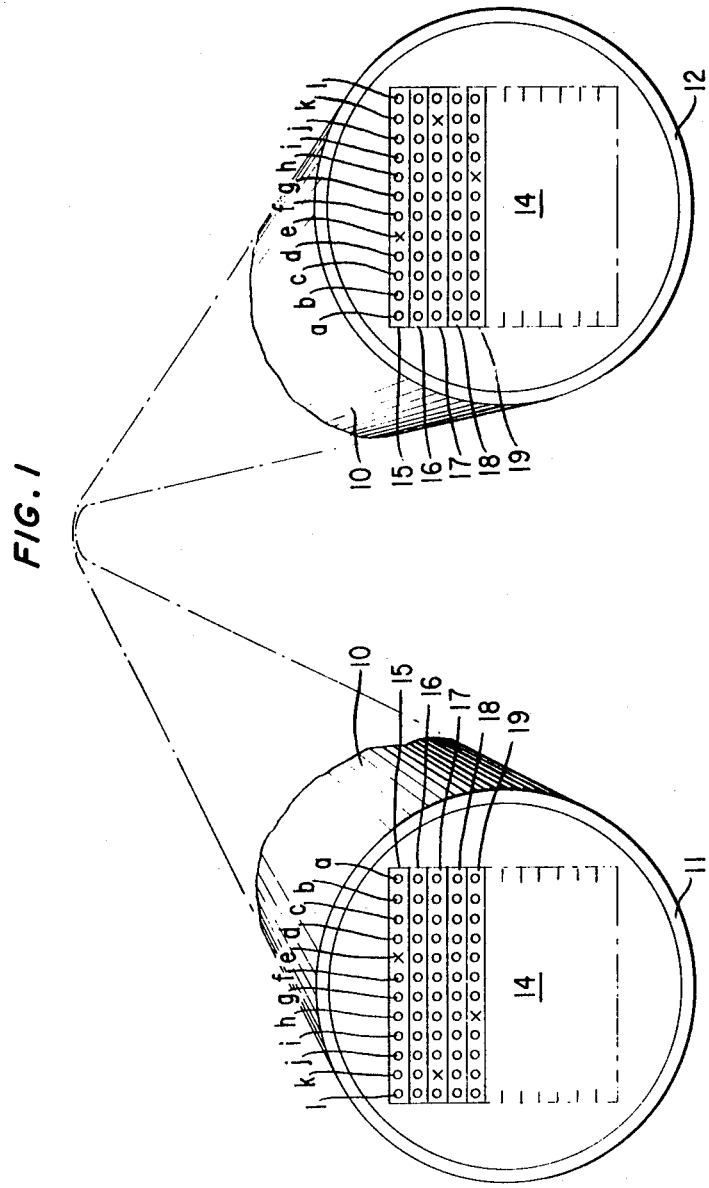

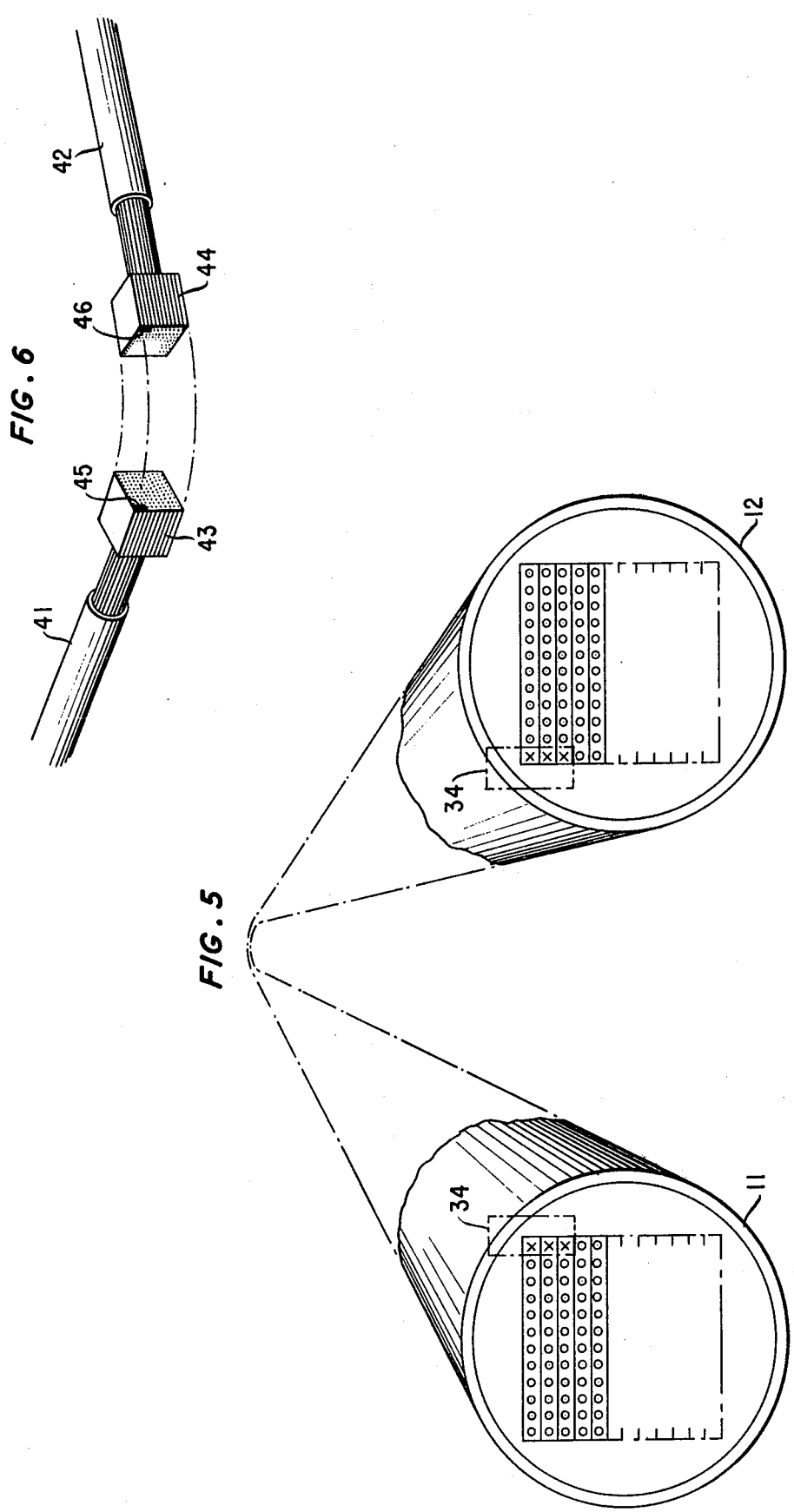

MINIMIZING TRANSMISSION PATH DISABLING DUE TO DEFECTIVE TRANSMISSION MEMBERS OF A COMMUNICATIONS CABLE

FIELD OF THE INVENTION

This invention relates to communications cable structures and, in particular, to a system for reducing the number of defective transmission paths present in a long cable run made up of several cable sections. The invention is particularly useful for optical fiber cables.

BACKGROUND OF THE INVENTION

Communications cables consist of a large number of separate transmission members which make up a core. Long runs of cable in the outside plant are most conveniently realized by splicing together several lengths of cable during installation along the cable route. While the preparation and completion of the splices has traditionally been a field operation, greater splicing efficiency and reliability can be achieved with gang-type connectors installed in the factory on the cable ends, which are simply plugged in to one another in a single operation in the field. This mode of joining cable sections preferably entails a form of splice known as straight-through splicing; and thus does not contemplate the custom connecting in the field of given transmission paths. As a result, any defective transmission members such as an open copper wire in a metallic core cable, or a broken fiber of an optical fiber cable, stand a high probability of being connected into a transmission path that includes otherwise fully functional members.

Nevertheless, the delicate structure of optical fibers as well as the alignment precision required in fiber splices, make the use of factory-applied end connectors and straight-through splicing an extremely attractive expedient in the field splicing of optical fiber cables. However, any optical fiber breaks are almost always catastrophic; and thus a single break in one optical fiber in one section removes from service not only that fiber but the entire line of series-connected fibers in successive cable sections as well - although these are probably themselves intact.

The proliferating effects that broken fibers in each of several cable sections have on the efficiency of an overall cable system, are considerable. For example, a single broken fiber in each of five series-connected cable sections in a core of one hundred fibers, could render the entire system five percent unusable. In a system consisting of fifty cable sections, a break in a single fiber in each section could render the overall system up to fifty percent unusable.

SUMMARY OF THE INVENTION

Pursuant to one broad aspect of the invention, the transmission members of a communications cable are in effect rearranged in relative location within the cable core, by associating all defective members with a designated small area of a predetermined and fixed cable core end array configuration. As a result, gang-type connectors applied advantageously at the factory to the cable core ends connect the defective transmission members only through a designated fixed end region of the connector. Several such cables when spliced together occasion a minimum of transmission path disabling. The defective members, instead of appearing more or less randomly in end positions throughout the entire cable cross section, are connected to each other so that their potential disabling impact is not proliferated when a number of such connectorized cables are joined in series.

Pursuant to a particular aspect of the invention as it applies to straight-through spliced optical cable, broken fiber line proliferation is avoided by repositioning the fibers at the ends of the optical fiber cable so that broken fibers appear only in a specific geometric subset in the fiber array. Connectors applied to these rearranged cable ends limit broken fibers to positions within a designated small cross section of the connector.

Preferably, the relocating is accomplished under factory conditions. If the cable is made up of a stack of optical fiber ribbons, those ribbons having broken fibers are rearranged to appear in a specific location such as the outside of the ribbon stack. Further, the ribbons are oriented, or rotated, so that looking at one end of the cable, the broken fibers are located to one side or the other of the vertical center plane of the stack.

Pursuant to a further facet of the invention, broken fiber line effects can be further reduced. By breaking off two or three inches of the ends of each fiber that does not transmit, a new fiber end grouping can be achieved in which the other fibers are repositioned adjacent to one another. In terms of end position, the broken fibers in effect are now pushed to one side in the ribbon array at the connector point.

Now, when several optical fiber cable cores are series-connected in straight-through splicing, there exists a high probability that the bad fibers will all be located in the same series of fiber lines, the latter having been isolated from the good fiber line by the foregoing procedure.

The invention and its further objects, features and advantages will be readily comprehended from a reading of the detailed description and illustrative embodiments about to be delineated.

DESCRIPTION OF THE DRAWING

FIG. 1 is a schematic illustration of a cable fiber core showing the end position of broken fibers;

FIG. 5 schematically shows broken fiber ends after further rearrangement;

FIG. 6 illustrates schematically two cable ends that have been connectorized so that bad communications paths are isolated in a prescribed region of the connector end matrix.

DETAILED DESCRIPTION OF THE ILLUSTRATIVE EMBODIMENTS

Figure 4:
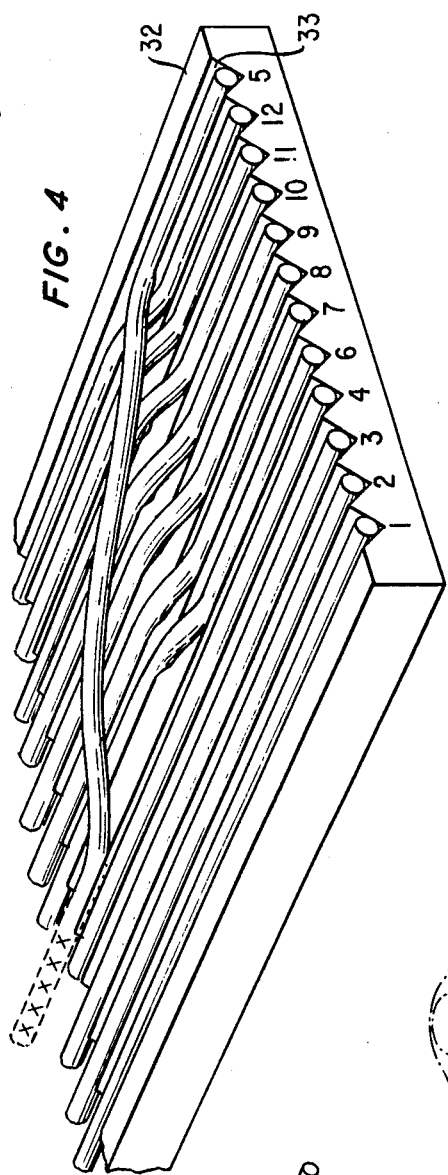
FIG. 4 shows a fiber organizer.

FIG. 1 depicts schematically a communications cable 10, which advantageously - although not necessarily - can be an optical fiber cable. For illustration's sake, both ends 11, 12 are viewed in the same plane. The cable illustrated includes protective jacketing 13 plus a core 14 of stacked optical fiber ribbons, of which ribbons 15–19 are shown. As an example, twelve fiber ribbons make up a stack; and each ribbon includes a number, for example, twelve, of spaced optical fibers denoted by the letters $a$ through $l$.

Although the benefits of the invention are not limited to mitigating broken fiber line damage when just one fiber per ribbon is broken, or when only three of the ribbons contain breaks, the invention may be conveniently illustrated with that situation in mind. Suppose, therefore, that an inspection of fiber ribbon 15 in the factory reveals that the fiber occupying position 15e, denoted in FIG. 1 by the 'x' mark, is broken. Inspection reveals all fibers in ribbons 16 and 18 to be intact; but fibers 17k and 19h are found also to be broken.

Figure 2:
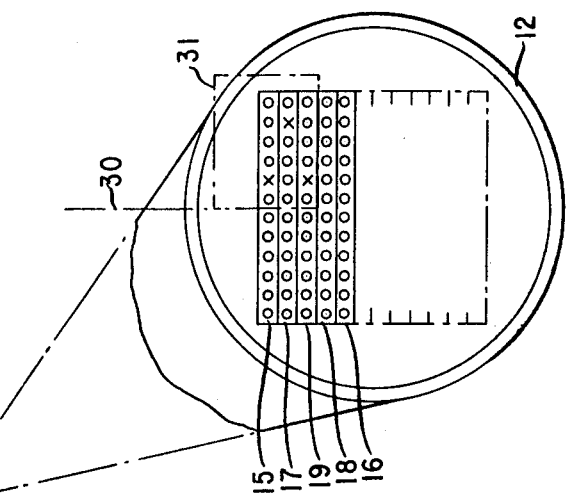
FIG. 2 shows broken fiber end position after rearrangement.

Pursuant to one aspect of the invention, the ribbon stacking sequence is rearranged as illustrated in FIG. 2, so that the fiber ribbons 15, 17 and 19 which have broken fibers are adjacent to one another. In this example they become the outermost three ribbbons, thus isolating all ribbons with fiber faults in a region of the end matrix that constitutes a relatively small fraction of the whole.

Then, pursuant to a second inventive aspect, as also illustrated in FIG. 2, the end matrix region containing bad fibers is further reduced. Specifically, top ribbon 15 is turned over 180° at each end of the cable section. As a result, the broken fibers now occur in positions within a defined small subset of the end matrix, instead of randomly throughout the matrix. For cable end 11 the subset is to the left of the plane 30 which divides the two sides of the end array; and for end 12 these positions are to the right of the plane 30.

As seen in FIG. 2 the end matrix subset within which broken fibers can exist has been reduced to 18 positions denoted by the call-out 31. No matter how many cable sections are spliced together, in this illustration no more than 18 fiber lines are unusable as optical transmission media. The other 126 fiber lines of the 144 line cable at this stage in their lives are intact.

Figure 3:
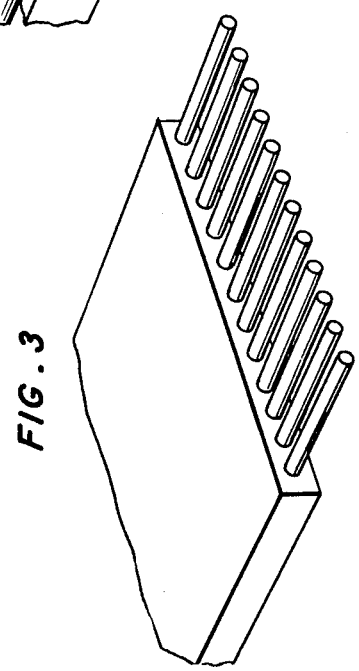
FIG. 3 shows a fiber ribbon end with the ribbon material removed to expose short fiber lengths.

Pursuant to a still further aspect of the invention, the broken fibers can be further relocated in position and thus further reduce the subset size of fiber break locations. Following upon the just described rearrangement steps, each of the ribbons 15, 17 and 19 are stripped back a distance of about three inches from each end to expose all fibers, as illustrated in FIG. 3. The exposed protruding sections of those fibers which do not transmit, are broken off and removed.

Now, as seen in FIG. 4, the remaining fibers are placed in a sorter 32 which has fiber grooves 33 to receive the intact fibers. For illustration, FIG. 4 depicts the broken fiber in dashed line, and located originally between fibers 4 and 6. In the rearrangement process depicted in FIG. 4, the intact fibers to the right of broken fiber 5 have each been shifted left by one space. The broken fiber may be considered to be occupying a position to the right of slot 11, it having in effect moved to the right. While so positioned, the fibers are stabilized by reapplying the upper and lower tapes, removing the fibers from the sorter 32 and proceeding with connector application.

As a result of the foregoing steps, all the fiber breaks present in the array will be relocated to one side of the array as shown in FIG. 5 by the callout 34 which shows the broken fibers occupying the end three fiber positions in the top three ribbons. The subset of fiber break locations is now reduced to three. No matter how many cable sections are spliced together, no more than three fiber lines will be lost.

To achieve the benefits of the invention in the straight-through splicing in the field, a specific connector end in one cable section must be connected to a specific connector end of the cable being spliced to it. Thus, as illustrated in FIG. 6, two communications cables 41, 42, with installed end connectors 43, 44, are connected so that the end matrix subsets 45, 46, containing the defective transmission members will mate with each other.

An added advantage stemming from the technique described is that more broken fibers can be allowed in a cable without it being rejected at the factory. Hence, longer cables can be made in the factory, which in turn reduces the number of splices required or alternatively reduces the fiber ribbon and cable rejection rate.

There has thus been described a general method of mitigating the effects of straight-through splicing associated with connectorized cables. The approach involves restructuring the location of broken fibers or wire pairs to specific subsets of a fixed geometric end configuration of the connector. The number of unusable transmission paths resulting from breaks in the individual cable sections is greatly reduced. Connectorized cable either or metallic or optical fiber core, or both, is thus more practicable even when a large number of cable sections each containing some defects are joined together.

The benefits of the invention accrue to any multi-pair communications cable, but are particularly advantageous for optical fiber cables because, among other things, of the inherent randomness of the fiber strength and their extreme sensitivity to damage. Specifically, the poor handling characteristics of the fibers make it highly desirable that individual fibers not be spliced under field conditions. Staight-through splicing using connectors advantageously applied at the factory avoids the field handling disadvantages. The present invention by restricting the proliferation of the effects of fiber breaks makes factory connectorization of optical fiber cable feasible.

The spirit of the invention is embraced in the scope of the claims to follow.

What is claimed is:

1. A communications cable comprising a core of transmitting members defined as a complete set including one or more defective members, CHARACTERIZED IN THAT the ends of the defective members are rearranged to appear only in a defined subset of adjacent end positions.

2. An optical fiber communications medium comprising a series of cables constructed as defined in claim 1 and connected so that said subsets of end positions mate only with each other at the points of connection.

3. An optical fiber cable section comprising a core of fibers consisting of a stack of fiber-containing ribbons forming an x–y matrix of fibers at the section ends and including one or more non-transmitting fibers, CHARACTERIZED IN THAT the non-transmitting fibers are rearranged to appear only in a defined contiguous subset of fiber end positions.

4. An optical fiber cable comprising a series of cable sections constructed as defined in claim 3 and connected so that said subsets of fiber end positions mate only with each other at the points of connection.

5. The optical fiber cable section defined in claim 3 wherein said subset embraces at each end a corner of said matrix of fiber ends linked by the same fiber lines.

6. The optical fiber cable section defined in claim 3 wherein said subset occupies a fixed portion of said matrix.

7. A method of mitigating broken fiber effects in an optical fiber cable consisting of a core of fibers including one or more non-transmitting fibers, comprising the steps of rearranging the broken fibers to occupy positions only within a defined contiguous subset of fiber ends.

8. The method of claim 7 comprising the further steps of connecting together two or more sections of cable with the fibers so rearranged that said subsets of fiber end positions mate only with each other at the points of connection.

9. A method of mitigating broken fiber effects in an optical fiber cable comprising a core of fiber-containing ribbons, stacked to form at its ends an $x$–$y$ matrix of fiber ends and including one or more non-transmitting fibers, comprising the step of:

relocating all ribbons containing a non-transmitting fiber to the top-most contiguous ribbon positions of said stack.

10. The method of claim 9 comprising the further step of:

rotating one or more of said relocated ribbons to create the smallest possible subset of fiber ends within which said non-transmitting fibers are included.

11. The method of claim 10, comprising the further steps of:

removing an end length from each non-transmitting fiber; and shifting the transmitting fibers into side-by-side position thus to occupy any positions vacated by said non-transmitting fiber positions and to relocate all non-transmitting fiber positions in effect to one side of said core.

12. An optical fiber cable comprising a plurality of fibers spaced cross-sectionally in a predetermined configuration, in which any broken fibers of said cable are arranged to appear only in a fixed designated zone of the fiber matrix at either end of the said cable.

13. A communications cable comprising a core consisting of a multiplicity of individual transmission paths including one or more defective paths CHARACTERIZED IN THAT the end configuration of the transmission paths is predetermined and the defective paths are rearranged to appear only in a defined subset of end positions.

14. The communications cable of claim 13, further comprising a connector at each end containing the multiplicity of individual paths in a fixed geometric end configuration with the defective paths appearing only in a fixed unvarying subset of connector end positions within said end configuration.

15. A communications system comprising a plurality of connectorized communications cables as described in claim 14 joined together with the defective paths of each individual cable being connected in series relation through the mating of successive said end subsets only with each other.

16. The communications cable of claim 14 wherein said core comprises a stack of ribbons containing optical fibers in a fixed $x$–$y$ matrix of fiber end configuration.

* * * * *